(12) United States Patent
Hart

(10) Patent No.: US 7,617,361 B2
(45) Date of Patent: Nov. 10, 2009

(54) CONFIGUREABLE REDUNDANT ARRAY OF INDEPENDENT DISKS

(75) Inventor: David Allen Hart, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 11/277,819

(22) Filed: Mar. 29, 2006

(65) Prior Publication Data

US 2007/0233949 A1    Oct. 4, 2007

(51) Int. Cl.
  *G06F 12/16* (2006.01)
(52) U.S. Cl. ........................... 711/114; 711/162
(58) Field of Classification Search ................ None
  See application file for complete search history.

(56) References Cited

U.S. PATENT DOCUMENTS

| | | | |
|---|---|---|---|
| 5,845,319 A | 12/1998 | Yorimitsu | |
| 6,052,759 A | 4/2000 | Stallmo et al. | |
| 2003/0070043 A1 | 4/2003 | Merkey | |
| 2003/0074527 A1* | 4/2003 | Burton et al. | 711/114 |
| 2004/0059869 A1 | 3/2004 | Orsley | |
| 2004/0133743 A1* | 7/2004 | Ito et al. | 711/114 |
| 2005/0097270 A1* | 5/2005 | Kleiman et al. | 711/114 |
| 2005/0108474 A1* | 5/2005 | Zhang et al. | 711/114 |
| 2005/0125610 A1 | 6/2005 | Korgaonkar | |
| 2005/0235128 A1 | 10/2005 | Rustagi et al. | |
| 2006/0129875 A1* | 6/2006 | Barrall | 714/6 |
| 2006/0174157 A1* | 8/2006 | Barrall et al. | 714/6 |
| 2007/0266037 A1* | 11/2007 | Terry et al. | 707/100 |

* cited by examiner

*Primary Examiner*—Than Nguyen
(74) *Attorney, Agent, or Firm*—Yee & Associates, P.C.; Libby Z. Handelsman

(57) ABSTRACT

A computer implemented method, data processing system, and computer program product for maximizing the amount of data protected in a Redundant Array of Independent Disks (RAID) storage system. When a request to configure a plurality of physical disk drives into a Redundant Array of Independent Disks is received, each of the plurality of physical disk drives is divided into blocks of data based on a least common denominator. The blocks of data are then arranged to form valid Redundant Array of Independent Disks parity sets, thereby maximizing the amount of data protected in the Redundant Array of Independent Disks.

18 Claims, 4 Drawing Sheets

CONFIGUREABLE REDUNDANT ARRAY OF INDEPENDENT DISKS

BACKGROUND OF THE INVENTION

1. Field of the Invention

The present invention relates generally to data recovery in computer systems, and in particular, to a computer implemented method, data processing system, and computer program product for maximizing the amount of data protected in a Redundant Array of Independent Disks (RAID) storage system.

2. Description of the Related Art

Hard disk drives ("hard drives") are the main data storage devices for most computers or processors. Typical hard drives contain a number of hard disk platters ("disks") coated with magnetic material for storing data in magnetized form. The disks are affixed to a spindle that spins them in unison at a constant rate. An actuator arm moves one or more read/write heads radially across the disks to retrieve or store the magnetized data. The hard drive's components (disks, spindle, actuator arm, read/write heads, associated motors and electronics, etc.) are enclosed within a head disk assembly (HDA).

The HDA protects the hard drive's components from contamination by dust, condensation, and other sources. Contamination of a hard drive's disk or read/write head can result in disk failure, head crash and/or an unrecoverable loss of data. Also, data loss can be caused by other hard drive problems, such as electronic malfunctions, physical shocks, worn out components, improperly manufactured disks, etc.

One hardware approach to solving the problem of increased hard errors in hard drives is to employ a Direct Access Storage Device (DASD). One example of a DASD is a Redundant Array of Independent Disks (RAID). The RAID approach connects a plurality of hard drives together and treats them as a single, logical unit. Consequently, a computer sees the plurality of drives as one, large hard drive that can be formatted and partitioned similar to that of a smaller, individual drive. RAID implementations enhance the reliability/integrity of data storage through the writing of data "stripes" across a given number of physical disks in the RAID set, and the appropriate storing of redundant information with respect to the striped data. The redundant information enables recovery of data lost when a storage device fails.

The redundancy thus provided by the multiple hard drives of the RAID approach enhances the recovery of lost data due to hard errors, and also increases the performance of the computer system involved. Currently, however, the storage space of each disk available to be configured in a RAID is limited to the storage space size of the smallest disk in the array. For example, if two 35 GB disks are used to build a RAID together with a 70 GB disk, each disk will contribute 35 GB to the array for a total storage space of 105 GB for the RAID, while the remaining 35 GB of the larger disk remain unprotected. Thus, the amount of data protectable in existing RAID systems is restricted by the capacity of the smallest drive in the RAID set.

Therefore, it would be advantageous to have a method and system for increasing the amount of data protected in a RAID storage system.

SUMMARY OF THE INVENTION

Embodiments of the present invention provide a computer implemented method, data processing system, and computer program product for maximizing the amount of data protected in a Redundant Array of Independent Disks (RAID) storage system. When a request to configure a plurality of physical disk drives into a Redundant Array of Independent Disks is received, each of the plurality of physical disk drives is divided into blocks of data based on a least common denominator. The blocks of data are then arranged to form valid Redundant Array of Independent Disks parity sets, thereby maximizing the amount of data protected in the Redundant Array of Independent Disks.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
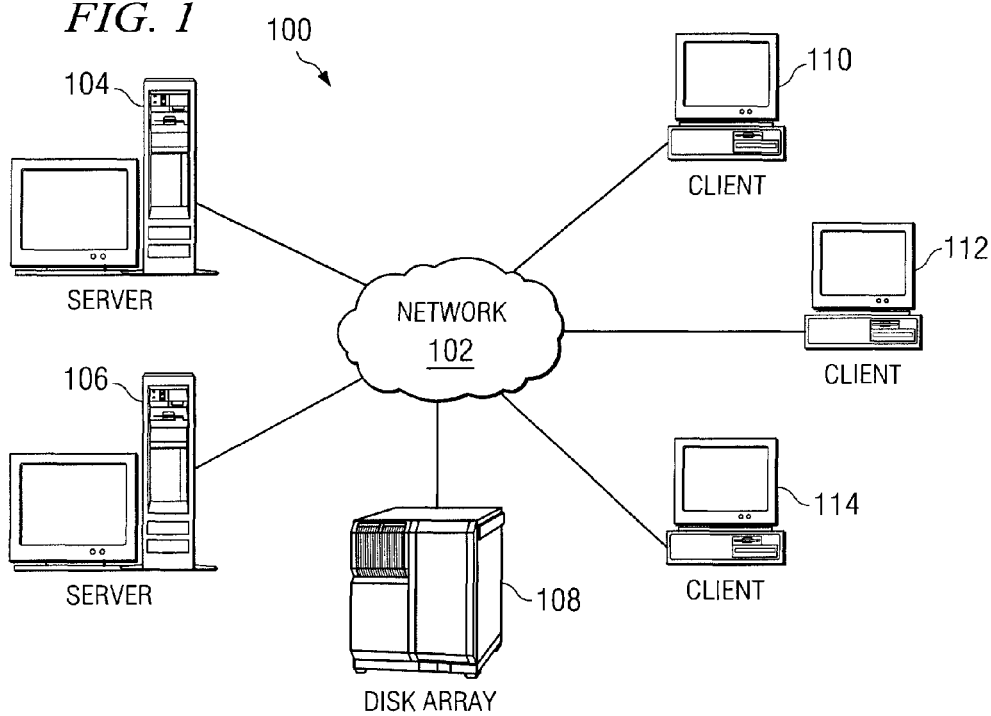
FIG. 1 is a pictorial representation of a exemplary network of data processing systems in which the present invention may be implemented.
Figure 2:
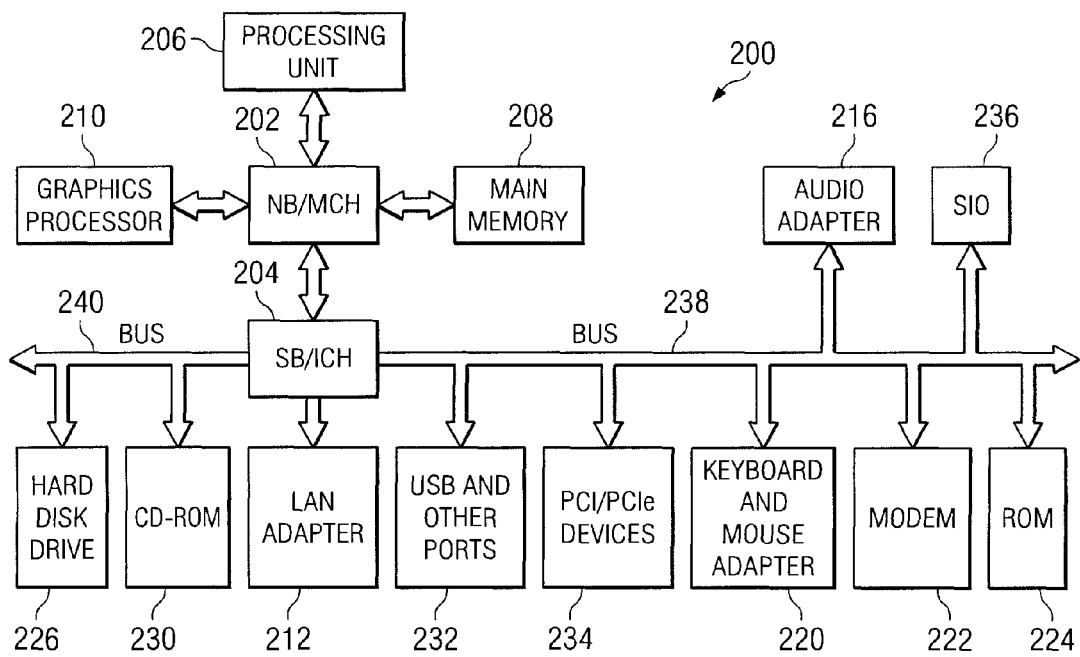
FIG. 2 depicts a exemplary block diagram of a data processing system that may be implemented in accordance with an illustrative embodiment of the present invention.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with disk array 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
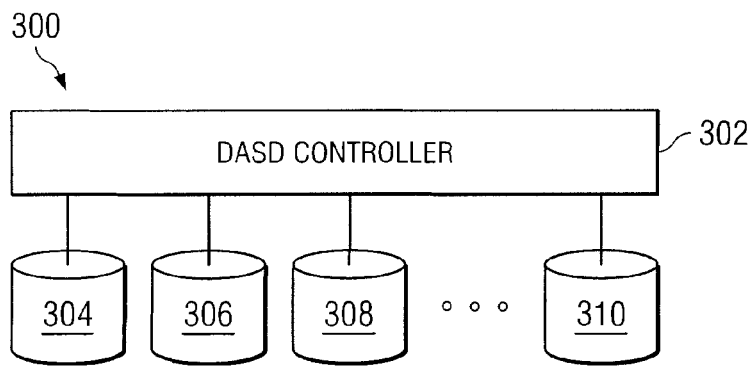
FIG. 3 is an exemplary block diagram illustrating a RAID storage sub-system in accordance with an illustrative embodiment of the present invention.

FIG. 3 depicts a RAID storage sub-system. RAID system 300 is an example of disk array 108 in FIG. 1. RAID system 300 is a data redundancy system where multiple copies of data are stored on a plurality of different storage devices in order to improve data integrity. Both the original data and redundant data (either duplicate data or parity data that can be used in conjunction with the original data to restore defective data) are stored on a plurality of disk drives. Data to be saved or backed-up is typically received from a host data processing system by Direct Access Storage Device (DASD) controller 302, which manages how to store the original and redundant data across a plurality of disk drives, such as, for example, disk drives 304, 306, 308, and 310.

There are several different types of RAID architectures or techniques, each offering various cost-benefits and performance trade-offs. For example, RAID 1 uses a concept of data mirroring, which duplicates data from a single logical drive across two physical drives such as drives 304 and 306. This creates a pair of drives that contain the same data. If one of these physical devices fails, the data is still available from the remaining disk drive. RAID 3 stripes data across all the data drives. Parity data is stored on a separate parity drive. The parity data can be used to reconstruct the data if a single disk drive fails. RAID 4 is similar to RAID 3, except that it used block-level striping of data across the drives instead of the byte-level striping as is done with RAID 3. Use of larger blocks for data striping improves performance. RAID 5 uses block-level striping and distributed parity. Both the data and parity information are spread across all the disks, thereby eliminating the dedicated parity disk bottleneck that can occur in RAID 3 and RAID 4, as well as eliminating the extra, dedicated parity disk. RAID 6 is similar to RAID 5 but uses a second parity scheme that is spread across all disks; thus providing an extremely high fault and drive failure tolerance. RAID 0 should be mentioned for completeness, although it does not provide data redundancy. Instead, it allows multiple physical drives to be concatenated together to form a large logical drive, and data striping is used to interleave blocks of data across the drives. This layout thus improves performance, in that a sequential read of data on the logical drive results in parallel reads to each of the physical drives.

A RAID set (or a disk set) is a specific number of drives grouped together with a single characteristic and may encompass the entire array or be a subset of the array. When building a RAID system, a user may choose the data protection level or "RAID flavor" to implement from one of the RAID architectures mentioned in FIG. 3 above. For example, if three or more drives are available to raid, the user may select a RAID 5 architecture, which protects the stored data in the event that one drive fails. If one drive fails, all data is still fully available, since the missing data is recalculated from the data still available and the parity information. However, if two drives fail, the data will be lost. Consequently, if the user desires increased fault tolerance and there are four or more drives available to raid, the user may select a RAID 6 architecture, which protects the stored data in the event that up to two drives fail.

Regardless of the RAID implementation used, each RAID configuration is still restricted by the capacity of the smallest drive in the RAID set, since the capacity of the smallest drive determines how much data may be protected by the RAID. Aspects of the present invention address this restriction by providing an amorphous RAID algorithm that relaxes or eliminates the restriction, thereby maximizing the amount of data protected of any sized drive in a given RAID set. Thus, while existing RAID configuration techniques allow a user to maximize the data protection level by selecting a desired RAID architecture, the amorphous RAID algorithm of the present invention expands upon the existing techniques by allowing a user to maximize the amount of data protected in the RAID set.

The amorphous RAID algorithm of the present invention maximizes the amount of protected data by first defining a primary element as block of data whose size is determined by a "least common denominator" concept. The least common denominator concept is used to divide the drives into a number of same-sized capacity blocks of data. The primary element size is determined by dividing a drive's capacity into blocks that may be arranged so as to maximize sets of three or more blocks in a parity set. In addition, each parity set may have only one primary element from any hard drive in the set. Furthermore, the size of each block should be such that the capacity covered in all of the drives through the parity set arrangement arrived at is maximized. Although the examples below use the capacity of the smallest drive in the drive set as the primary element size for purposes of illustration, the present invention is not limited to such an embodiment, and any algorithm for dividing the physical drives to maximize the amount of data protected may be used.

Once the primary element size is defined and the data blocks determined, the blocks may then be organized into valid RAID parity sets. As mentioned above, a valid RAID parity set requires that a minimum of three hard drives be represented in each set. An additional restriction is also applied to the organization of the blocks, the restriction requiring that no hard drive is represented more than once in any given parity set. Thus, a given parity set will not have two blocks on the same drive. If one hard drive were to have two parity blocks on it, that drive would then represent a single point of failure for the parity set. Since a parity set's purpose is to protect the drive against a single, or even double in the case of RAID 6, failure, this method must, at a minimum, support that restriction.

In contrast with current RAID configuration techniques which simply lay the drives side by side, the mechanism of the present invention arranges the drive blocks into parity sets to maximize the amount of protected data. A parity set is a group of data protected by a parity stripe. Parity is a technique of verifying the integrity of the stored data by checking data that has been moved or transmitted between computers to determine if data has been lost or written over. Parity protection may be used to recalculate lost information from existing data. If the disk storing the parity is lost, the parity may be regenerated from the data. If one of the data disks is lost, the data may be regenerated by adding the contents of the surviving data disks together and then subtracting the result from the stored parity.

Depending upon the type of controller used on board, the amorphous RAID algorithm may be implemented as a hardware embodiment, a software embodiment, or a combination of both. For instance, the amorphous RAID algorithm may be implemented in the form of a hardware RAID SCSI controller which incorporates a chipset that handles the division of the hard drives into blocks and the arrangement of those blocks into valid parity sets. Thus, a RAID SCSI controller having logic for implementing the amorphous RAID algorithm may be used as DASD controller 302, thus providing an entirely hardware solution. The amorphous RAID algorithm may also be implemented in the form of a software package which uses the system's CPUs to provide the processing power to divide up the drives and arrange the blocks. This implementation allows the use of DASD controllers such as an Integrated Drive Electronics (IDE) controller or a Serial Advanced Technology Attachment (SATA) controller, which do not have RAID capability via their respective onboard hardware. Thus, DASD controller 302 may be implemented as an IDE or a SATA controller, with the amorphous RAID algorithm implemented as a software solution.

In addition, the amorphous RAID algorithm may be used in situations where a customer has the need or desire to use DASD of various sizes. For example, this situation may occur where old drives are still functional, but obsolete and of a capacity that is no longer available. Rather than replace all of the old drives, the customer may replace the old drives as they fail, and still maintain a maximum amount of data protection.

Figure 4:
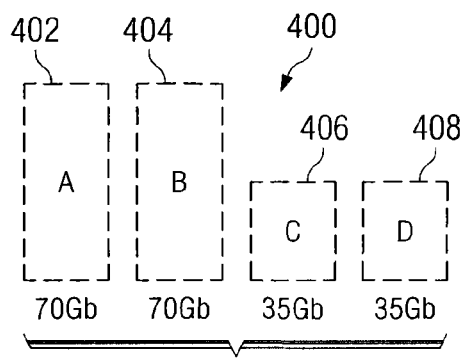
FIG. 4 is an exemplary block diagram illustrating a Direct Access Storage Device (DASD) prior to configuring a RAID.

Turning now to FIG. 4, an exemplary block diagram illustrating a Direct Access Storage Device (DASD) prior to configuring a RAID set is shown. In particular, Direct Access Storage Device 400 is a group of disk drives at a point before the disk drives are configured into a RAID system, such as RAID system 300 in FIG. 3. In this illustrative example, Direct Access Storage Device 400 comprises four disk drives: drive A 402, drive B 404, drive C 406, and drive D 408. Drive A 402 and drive B 404 each consists of 70 GB of available drive space, and drive C 406 and drive D 408 each consists of 35 GB of available drive space.

Figure 5:
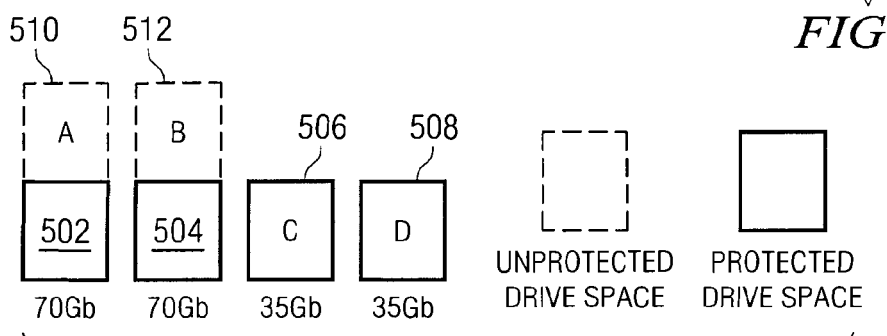
FIG. 5 is a block diagram illustrating protected and unprotected drive spaces resulting from using existing RAID configuration techniques on the DASD in FIG. 4.

FIG. 5 is a block diagram illustrating protected and unprotected drive spaces resulting from using existing RAID configuration techniques on the DASD in FIG. 4. With typical RAID configuration techniques, the amount of data raidable for each drive in a given RAID set is dependent upon the capacity of the smallest drive in the set. Current RAID configurations are limited to the smallest drive capacity since a parity stripe is comprised of a bit from each drive, such as drive A 502, drive B 504, drive C 506, and drive D 508. Three of the four drives contain the stored data, and one of the drives stores a parity bit comprising a mathematical algorithm based on the other three data bits. In this illustrative example, the smallest drives are drive C 506 and drive D 508, each consisting of 35 GB. Thus, using typical RAID configuration techniques, the maximum raidable space will be 35 GB for each drive. Typical RAID techniques cannot parity the remaining 35 GB drive space in both drive A 502 and drive B 504, since the excess capacity of these drives surpass the smallest drive in the set. As a result, there is insufficient drive space in drive C 506 and drive D 508 with which to compare bits in this excess capacity. The resulting RAID configuration protects 35 GB from each drive A 502, drive B 504, drive C 506, and drive D 508. As shown, the excess capacity (35 GB) 510 of drive A 502 and the excess capacity (35 GB) 512 drive B 504 is unprotected, for a total of 70 GB without parity protection.

Figure 6:
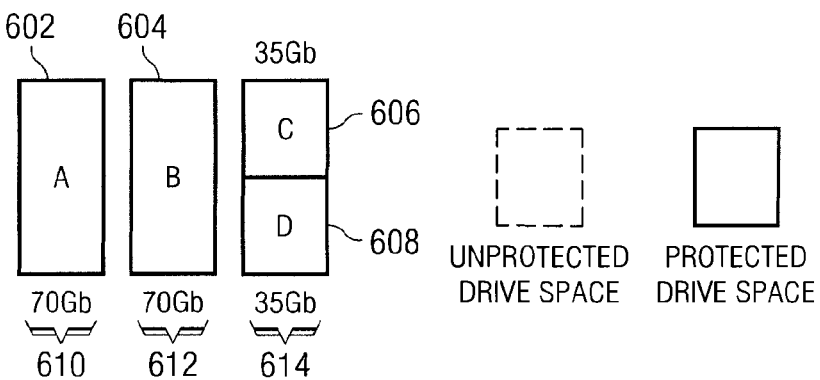
FIG. 6 is an exemplary block diagram illustrating the protected and unprotected drive spaces resulting from using the amorphous RAID configuration on the DASD in FIG. 4 in accordance with an illustrative embodiment of the present invention.

FIG. 6 is an exemplary block diagram illustrating the protected and unprotected drive spaces resulting from using the amorphous RAID configuration on the DASD in FIG. 4 in accordance with an illustrative embodiment of the present invention. With the amorphous RAID methodology of the present invention, the amount of data under parity protection may be increased beyond the amount of data protected in FIG. 5 in a typical RAID configuration. In this particular example, all of the drive space in drive A 402, drive B 404, drive C 406, and drive D 408 in FIG. 4 may be protected. Accordingly, the 70 GB of drive space in each of drive A 602 and drive B 604 and the 35 GB in each of drive C 606 and drive D 608 may be protected, for a total of 210 GB. Thus, no drive space is unprotected using the amorphous RAID methodology, while 70 GB is unprotected using the typical RAID configuration as described in FIG. 5.

It should be noted that with the amorphous RAID methodology, the same restrictions of the RAID architectures are inherited and are applicable. For example, if four drives are available to raid as shown in FIG. 4, the user may elect to have a typical RAID configuration (a parity stripe with four drive elements side by side) as shown in FIG. 5, or maximize the amount of data protected with the amorphous RAID configuration (a parity stripe with three drive elements 610, 612, and 614). In other words, while the typical RAID configuration of DASD 400 in FIG. 4 results in a RAID 6 architecture with the high tolerance of two parity stripes as shown by FIG. 5, the amorphous RAID configuration may result in a RAID 5 architecture with a lesser data protection level (only one parity stripe), but more of the drive space will be under parity protection. Thus, using the amorphous algorithm as shown in FIG. 6, the user may maximize the drive capacity that is raided, but the result is a RAID 5 architecture for the array. In contrast, typical RAID techniques will result in 70 GB that is not parity protected, but the array will be in a RAID 6 configuration. Consequently, two drives may fail and the data is still maintained. Thus, a user having two 35 GB drives and two 70 GB drives may choose to maximize the amount of data protected with three drive elements and RAID all of the capacity, rather than waste the excess capacity in a parity stripe with four drive elements.

Figure 7:
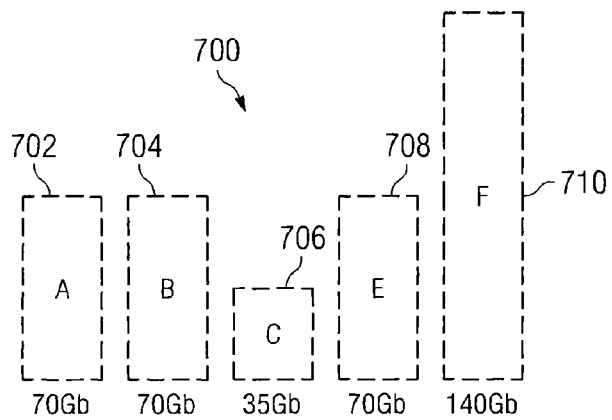
FIG. 7 is an exemplary block diagram illustrating a Direct Access Storage Device (DASD) prior to configuring a RAID.

FIG. 7 is an exemplary block diagram illustrating a Direct Access Storage Device (DASD) prior to configuring a RAID. Direct Access Storage Device 700 is a group of disk drives at a point before the disk drives are configured into a RAID system, such as RAID system 300 in FIG. 3. In this illustrative example, Direct Access Storage Device 700 comprises five disk drives: drive A 702, drive B 704, drive C 706, drive E 708, and drive F 710. Drive A 702, drive B 704, and drive E 708 each consists of 70 GB of drive space, drive C 706 consists of 35 GB of drive space, and drive F 710 consists of 140 GB of drive space.

Figure 8:
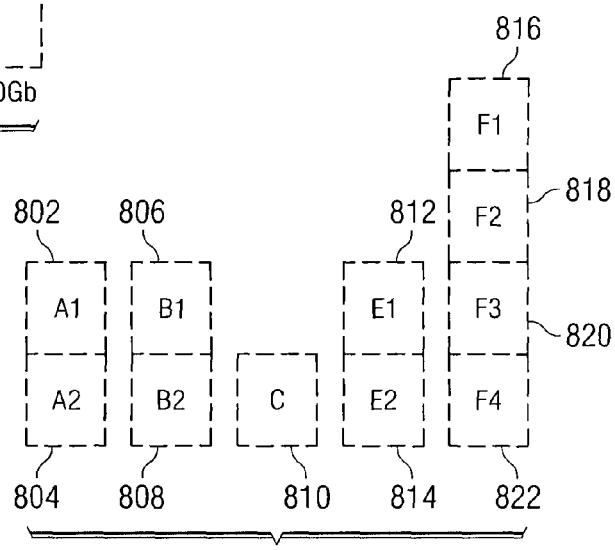
FIG. 8 is an exemplary block diagram illustrating the division of drive space according to a least common denominator in accordance with an illustrative embodiment of the present invention.
Figure 9:
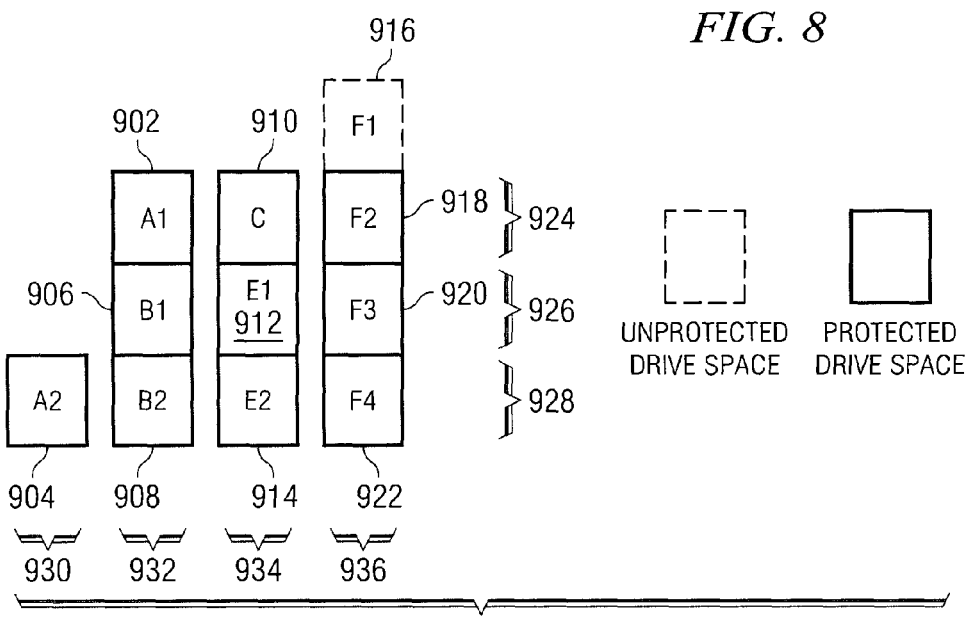
FIG. 9 is an exemplary block diagram illustrating the organization of drive space blocks created in FIG. 8 into valid parity sets to maximize the amount of data protected in accordance with an illustrative embodiment of the present invention.

FIGS. 8 and 9 are block diagrams depicting the amorphous RAID configuration methodology in accordance with an illustrative embodiment of the present invention. In particular, FIG. 8 is an exemplary block diagram illustrating the division of drive space according to a least common denominator. Each drive in DASD 700 in FIG. 7 is divided into primary elements, or blocks A1 802, A2 804, B1 806, B2 808, C 810, E1 812, E2 814, F1 816, F2 818, F3 820, and F4 822. The primary element size used in this illustrative example is the capacity of the smallest drive in the DASD (35 GB drive C 706 in FIG. 7). However, the primary element size is not required to be the capacity of the smallest drive, and other data block sizes may be used. As previously mentioned, the primary element size may be obtained by employing a least common denominator concept that divides the drives in a manner that maximizes sets of three or more blocks in a parity set, where each parity set has only one block of data from any given hard drive, and the size of the blocks are such that the capacity covered in all of the drives through the parity set arrangement is maximized.

FIG. 9 is an exemplary block diagram illustrating the organization of drive space blocks created in FIG. 8 into valid parity sets to maximize the amount of data protected using the amorphous RAID configuration of the present invention. Once the drive blocks are determined in FIG. 8, the blocks may then be organized into valid RAID parity sets. As a minimum of three physical drives are needed to make a valid RAID parity stripe, blocks A1 902, A2 904, B1 906, B2 908, C 910, E1 912, E2 914, F1 916, F2 918, F3 920, and F4 922 are organized by stacking the blocks in such a manner as to have at least three physically different drives represented in any given parity set. A further restriction is applied to the organization of the blocks, which requires that no physical drive (e.g., drive A) in any given parity set is represented more than once in the set. In other words, a parity set may not comprise two blocks (e.g., A1 and A2) of the same drive.

For example, as shown in FIG. 9, the blocks are arranged into three valid parity sets (924, 926, 928) across four physical drives (930, 932, 934, 936) to maximize the amount of protected data. Parity set 1 924 comprises blocks A1 902, C 910, and F2 918, parity set 2 926 comprises blocks B1 906, E1

912, and F3 920, and parity set 3 928 comprises blocks A2 904, B2 908, E2 914, and F4 922. The amorphous RAID configuration in FIG. 9 also adheres to the restriction that no physical drive may be represented twice in a given parity set, since each drive (A, B, C, E, and F) is represented only once in each of parity sets 924, 926, and 928.

The RAID configuration in FIG. 9 results in leaving only 35 GB (F1 916) unprotected out of a total 385 GB of drive space. In contrast, a typical RAID configuration may protect only a 35 GB section of all five drives shown in FIG. 7, or alternatively protect 70 GB on four drives and leave the small 35 GB drive out of the RAID set. Out of a total 385 GB of drive space, the first typical RAID configuration mentioned leaves 210 GB unprotected, and the second typical RAID configuration leaves 105 GB unprotected. Thus, the amorphous RAID algorithm of the present invention allows for increasing the amount of data protected on the drives over existing RAID configuration methods.

Figure 10:
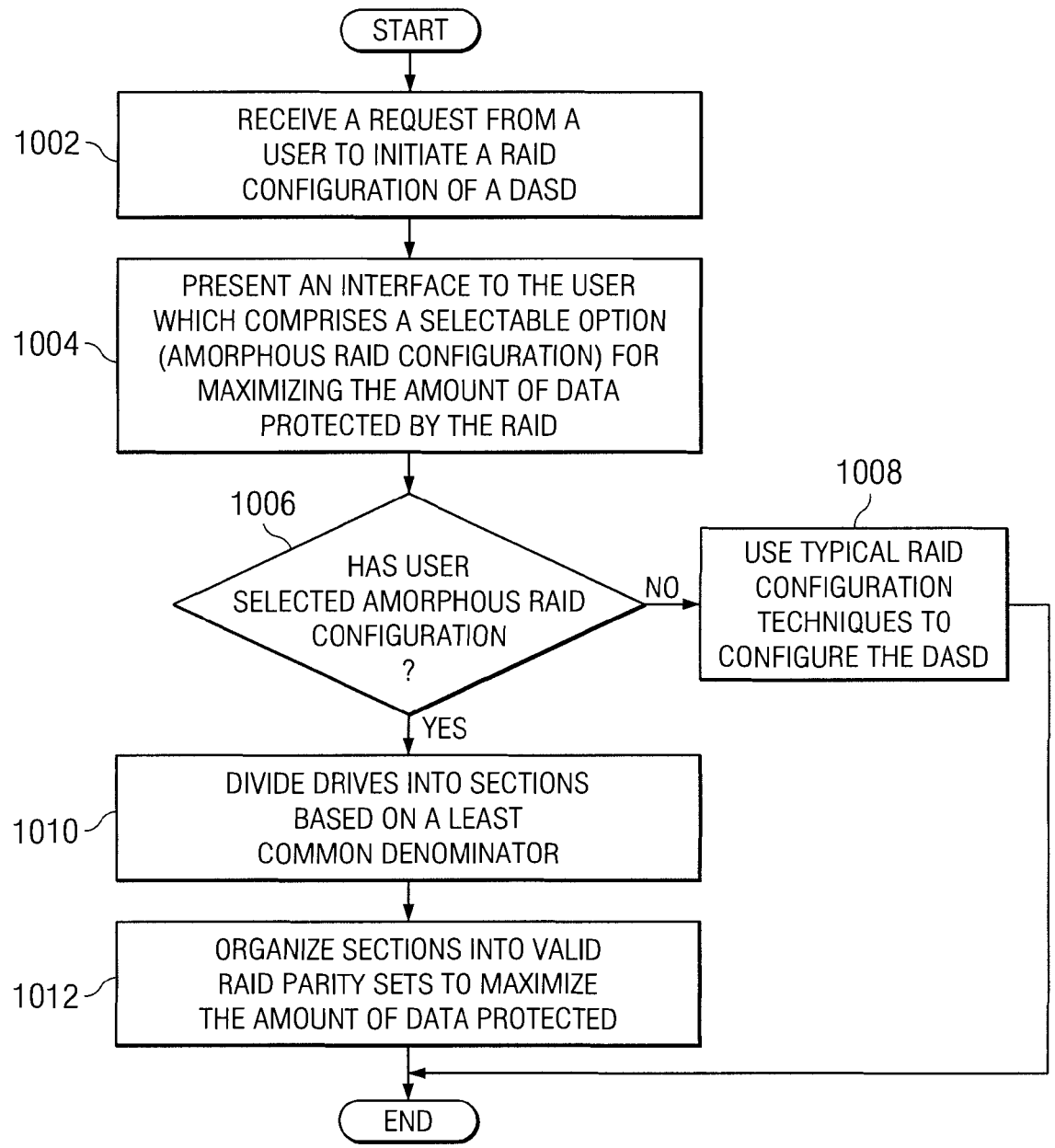
FIG. 10 is a flowchart of a process for maximizing the amount of data protected in a RAID storage system in accordance with an illustrative embodiment of the present invention.

FIG. 10 is a flowchart of a process for maximizing the amount of data protected in a RAID storage system in accordance with an illustrative embodiment of the present invention. The process begins with receiving a request from a user to initiate a RAID configuration of a DASD (step 1002). Responsive to receiving the request, an interface comprising an option for maximizing the amount of data protected using the amorphous RAID methodology of the present invention is presented to the user (step 1004). The interface may comprise a menu of typical RAID architectures (e.g. RAID 0, 1, 2, etc.), as well as the new amorphous RAID designation for maximizing the protected data. Upon receiving user input at the interface, a determination is made as to whether the user has selected the amorphous RAID configuration to maximize the amount of data protected on the drives (step 1006). If the user has selected a typical RAID configuration to maximize the protection level of the data on the drives, typical RAID configuration techniques are used to configure the DASD (step 1008), with the process terminating thereafter.

Turning back to step 1006, if the user has selected to maximize the amount of data protected with the amorphous RAID configuration, the drives are divided into primary elements (data blocks) whose sizes are based on a least common denominator concept (step 1010). The least common denominator concept allows for dividing the drives in a manner that results in at least one valid parity stripe across three or more physical drives. The primary elements or data blocks are then organized into parity sets to maximize the amount of data protected (step 1012). Restrictions on organizing the blocks to maximize the amount of data protected include arranging the blocks in such a manner as to have at least three physically different drives represented in any given parity set, and no physical drive in any given parity set is represented more than once.

The invention can take the form of an entirely hardware embodiment, an entirely software embodiment or an embodiment containing both hardware and software elements. Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for increasing an amount of data protected in a Redundant Array of Independent Disks, the computer implemented method comprising:

responsive to receiving a request to configure a plurality of physical disk drives that include a plurality of different storage capacities having a common denominator into a Redundant Array of Independent Disks, dividing an entire storage capacity of each of the plurality of different storage capacities having the common denominator into one or more primary elements that are same-sized capacity blocks of data based on the entire storage capacity of a smallest physical disk drive in the plurality of physical disk drives so that the entire storage capacity of each of the plurality of different storage capacities is included within one or more of the primary elements; and arranging the primary elements to form a plurality of valid Redundant Array of Independent Disks parity sets to increase the amount of data protected in the Redundant Array of Independent Disks, wherein each of the plurality of valid Redundant Array of Independent Disks parity sets must include a primary element of the primary elements from at least three or more physical disk drives in the plurality of physical disk drives.

2. The computer implemented method of claim 1, wherein a valid Redundant Array of Independent Disks parity set is a group of data protected by a parity stripe.

3. The computer implemented method of claim 1, wherein each of the plurality of valid Redundant Array of Independent Disks parity sets include only one primary element of the primary elements from each of the plurality of physical disk drives.

4. The computer implemented method of claim 1, further comprising:
responsive to receiving the request, providing an interface to a user, wherein the interface includes an option to increase the amount of data protected in the Redundant Array of Independent Disks.

5. The computer implemented method of claim 4, wherein the dividing and arranging steps are performed in response to determining that the user has selected the option to increase the amount of data protected.

6. The computer implemented method of claim 4, wherein the interface includes a selectable menu of Redundant Array of Independent Disks architectures.

7. An apparatus for increasing an amount of data protected in a Redundant Array of Independent Disks, comprising:
a bus system;
a storage device connected to the bus system, wherein the storage device includes computer usable code;
at least one managed device connected to the bus system;
a communications unit connected to the bus system; and
a processing unit connected to the bus system, wherein the processing unit executes the computer usable code to divide an entire storage capacity of each of a plurality of different storage capacities having a common denominator in a plurality of physical disk drives into one or more primary elements that are same-sized capacity blocks of data based on the entire storage capacity of a smallest physical disk drive in the plurality of physical disk drives so that the entire storage capacity of each of the plurality of different storage capacities is included within one or more of the primary elements in response to receiving a request to configure the plurality of physical disk drives that include the plurality of different storage capacities having the common denominator into a Redundant Array of Independent Disks; and arrange the primary elements to form a plurality of valid Redundant Array of Independent Disks parity sets to increase the amount of data protected in the Redundant Array of Independent Disks, wherein each of the plurality of valid Redundant Array of Independent Disks parity sets must include a primary element of the primary elements from at least three or more physical disk drives in the plurality of physical disk drives.

8. The apparatus of claim 7, wherein a valid Redundant Array of Independent Disks parity set is a group of data protected by a parity stripe.

9. The apparatus of claim 7, wherein each of the plurality of valid Redundant Array of Independent Disks parity sets include only one primary element of the primary elements from each of the plurality of physical disk drives.

10. The apparatus of claim 7, wherein the processing unit executes the computer usable code to provide an interface to a user in response to receiving the request, wherein the interface includes an option to increase the amount of data protected in the Redundant Array of Independent Disks.

11. The apparatus of claim 10, wherein the processing unit executes the computer usable code to divide and arrange in response to determining that the user has selected the option to increase the amount of data protected.

12. The apparatus of claim 10, wherein the interface includes a selectable menu of Redundant Array of Independent Disks architectures.

13. A computer program product stored on a computer usable storage medium having computer usable program code tangible embodied thereon for increasing an amount of data protected in a Redundant Array of Independent Disks, the computer program product comprising:
computer usable program code configured to divide an entire storage capacity of each of a plurality of different storage capacities having a common denominator in a plurality of physical disk drives into one or more primary elements that are same-sized capacity blocks of data based on the entire storage capacity of a smallest physical disk drive in the plurality of physical disk drives so that the entire storage capacity of each of the plurality of different storage capacities is included within one or more of the primary elements in response to receiving a request to configure the plurality of physical disk drives that include the plurality of different storage capacities having the common denominator into a Redundant Array of Independent Disks; and
computer usable program code configured to arrange the primary elements to form a plurality of valid Redundant Array of Independent Disks parity sets to increase the amount of data protected in the Redundant Array of Independent Disks, wherein each of the plurality of valid Redundant Array of Independent Disks parity sets must include a primary element of the primary elements from at least three or more physical disk drives in the plurality of physical disk drives.

14. The computer program product of claim 13, wherein a valid Redundant Array of Independent Disks parity set is a group of data protected by a parity stripe.

15. The computer program product of claim 13, wherein each of the plurality of valid Redundant Array of Independent Disks parity sets include only one primary element of the primary elements from each of the plurality of physical disk drives.

16. The computer program product of claim 13, further comprising:
computer usable program code configured to provide an interface to a user in response to receiving the request, wherein the interface includes an option to increase the amount of data protected in the Redundant Array of Independent Disks.

17. The computer program product of claim 16, wherein the computer usable program code configured to divide and arrange is executed in response to determining that the user has selected the option to increase the amount of data protected.

18. The computer program product of claim 16, wherein the interface includes a selectable menu of Redundant Array of Independent Disks architectures.

* * * * *